United States Patent
Kracker et al.

(10) Patent No.: US 8,400,284 B2
(45) Date of Patent: Mar. 19, 2013

(54) SYSTEM AND METHOD FOR CONTROLLING HEADLIGHTS ON A VEHICLE IN RESPONSE TO WIPER OPERATION

(75) Inventors: Thomas G. Kracker, Marysville, OH (US); Tony D. Wang, Marysville, OH (US); John Sgueglia, Columbus, OH (US); David G. Peterson, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 12/878,418

(22) Filed: Sep. 9, 2010

(65) Prior Publication Data
US 2012/0062116 A1    Mar. 15, 2012

(51) Int. Cl.
*B60R 25/10*    (2006.01)
(52) U.S. Cl. ......... 340/426.27; 340/426.25; 340/426.28; 340/426.29; 340/426.34
(58) Field of Classification Search ............. 340/426.27, 340/426.25, 426.28, 426.29, 426.34
See application file for complete search history.

(56) References Cited

U.S. PATENT DOCUMENTS

| | | | |
|---|---|---|---|
| 5,187,383 | A | 2/1993 | Taccetta et al. |
| 5,449,974 | A | 9/1995 | Dunbar |
| 7,332,830 | B2 | 2/2008 | Yamazaki et al. |
| 7,378,753 | B2 | 5/2008 | Yamazaki et al. |
| 7,576,658 | B2 | 8/2009 | Ishikawa |
| 2006/0108932 | A1 * | 5/2006 | Yamazaki et al. .............. 315/82 |

* cited by examiner

*Primary Examiner* — Tuyet Thi Vo
(74) *Attorney, Agent, or Firm* — Rankin Hill & Clark LLP

(57) ABSTRACT

A method for controlling headlights on a vehicle includes detecting for a wiper switch state for a wiper switch on a vehicle, detecting wiper operations, incrementing a counter value by x until the counter value reaches a headlight ON threshold, counting toward a time threshold, decrementing the counter value by x until the counter value reaches a headlight OFF threshold value, and changing a state of the headlights based on the counter value reaching one of the headlight ON threshold and the headlight OFF threshold. Incrementing the counter value by x can occur in response to each detected wiper operation. Counting toward the time threshold can occur in response to detecting a wiper switch OFF state. Decrementing the counter value by x can occur in response to each instance of the time threshold elapsing with no change from the wiper switch OFF state. A plurality of intermediate counter values can be found between the headlight ON threshold and the headlight OFF threshold. A control system is also disclosed.

18 Claims, 5 Drawing Sheets

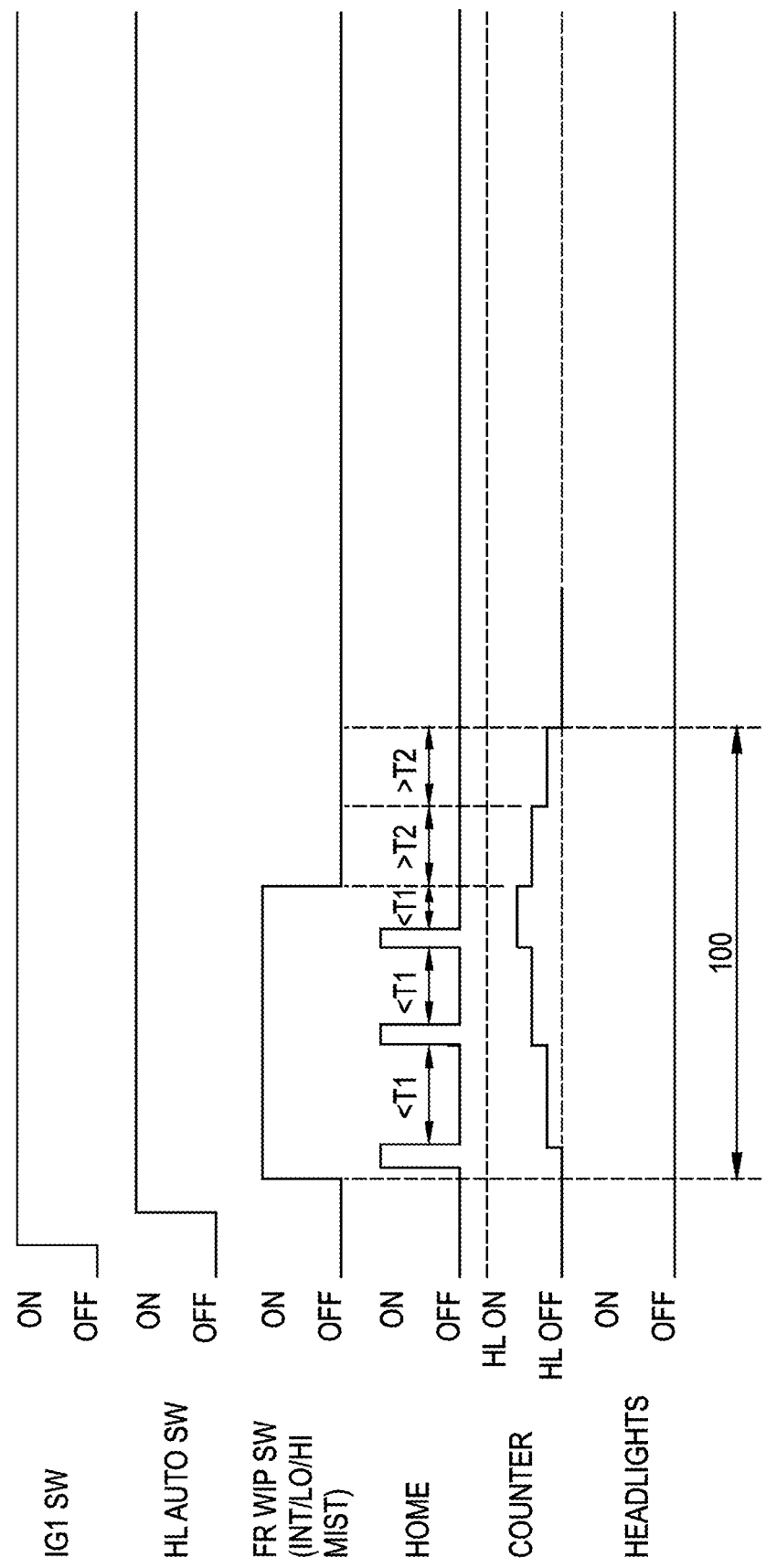

SYSTEM AND METHOD FOR CONTROLLING HEADLIGHTS ON A VEHICLE IN RESPONSE TO WIPER OPERATION

BACKGROUND

This disclosure relates to windshields wipers and automatic control of the headlights on a vehicle. Several vehicle manufacturers provide a system in which the headlights on a vehicle illuminate in response to the windshield wipers being turned ON. It is known to automatically turn ON the windshield wipers based on a wiper switch, which controls the operation of the windshield wipers, being turned to an ON position. Automatically turning ON the windshield wipers based on a wiper switch ON signal can result in the headlights rapidly turning ON and OFF, if the wiper switch is rapidly turned ON and OFF. For example, if the driver of vehicle turns ON the windshield wipers to clean the windshield and the headlights turn automatically ON in response to the wipers being ON, when the operator quickly turns the wipers ON and OFF, the lights can quickly turn ON and OFF. To oncoming traffic, this can look like the driver of the vehicle is flickering the headlights.

It is also known to automatically turn ON the windshield wipers based on detecting a predetermined number of wiper operations. A wiper operation is when the wipers complete a single back and forth stroke. For example, the headlights can turn ON after detecting three wiper operations. In this known process, however, if the wipers are turned OFF before the predetermined number of wiper operations have occurred, then a counter, which counts the number of wiper operations, resets so that an additional predetermined number, e.g. three, wiper operations must be detected before the headlights will turn ON.

Also, where the lights turn automatically OFF when the wipers are turned OFF, if the driver quickly turns the wipers back ON, this can also look like flickering lights to oncoming traffic.

SUMMARY

An example of a method for controlling headlights on a vehicle that can overcome at least one of the aforementioned shortcomings includes detecting for a wiper switch state for a wiper switch on a vehicle, detecting wiper operations, incrementing a counter value by x until the counter value reaches a headlight ON threshold, counting toward a time threshold, decrementing the counter value by y until the counter value reaches a headlight OFF threshold value, and changing a state of the headlights based on the counter value reaching one of the headlight ON threshold and the headlight OFF threshold. Incrementing the counter value by x can occur in response to each detected wiper operation. Counting toward the time threshold can occur in response to detecting a wiper switch OFF state. Decrementing the counter value by y can occur in response to each instance of the time threshold elapsing with no change from the wiper switch OFF state. In this example, a plurality of intermediate counter values are found between the headlight ON threshold and the headlight OFF threshold.

An example of a control system for controlling headlights of vehicle that can overcome at least one of the aforementioned shortcomings includes a wiper switch, a timer, a counter, and a control unit. The counter is configured to increment or decrement among a plurality of counter values between a headlight OFF threshold and a headlight ON threshold. Whether to increment or to decrement can be based on whether a state of the wiper switch changes to OFF before the timer measures that a time threshold has elapsed. The control unit is in communication with the wiper switch, the timer, and the counter. The control unit is configured to all for the delivery of a first power to the headlights when the counter value has reached the headlight OFF threshold and to allow for the delivery of a second power to the headlights when the counter value has reached the headlight ON threshold. The first power is greater than the second power.

Another method for controlling headlights of a vehicle includes detecting a wiper switch state, counting toward a time threshold, detecting a change from a wiper switch OFF state, determining whether a counter value has reached a headlight OFF threshold, operating the headlights in a first state when the counter value has reached the headlight OFF threshold, and incrementing or decrementing the counter value by one and repeating the detecting, counting and both determining steps when the counter value has not reached the headlight OFF threshold. Counting toward the time threshold can occur in response to detecting a wiper switch OFF state. Detecting a change from the wiper switch OFF state can occur before determining whether the time threshold has elapsed.

BRIEF DESCRIPTION OF THE DRAWINGS

FIGS. 3-5 are diagrams explaining examples of operation of the headlights and front wipers for the vehicle.

DETAILED DESCRIPTION

Figure 1:
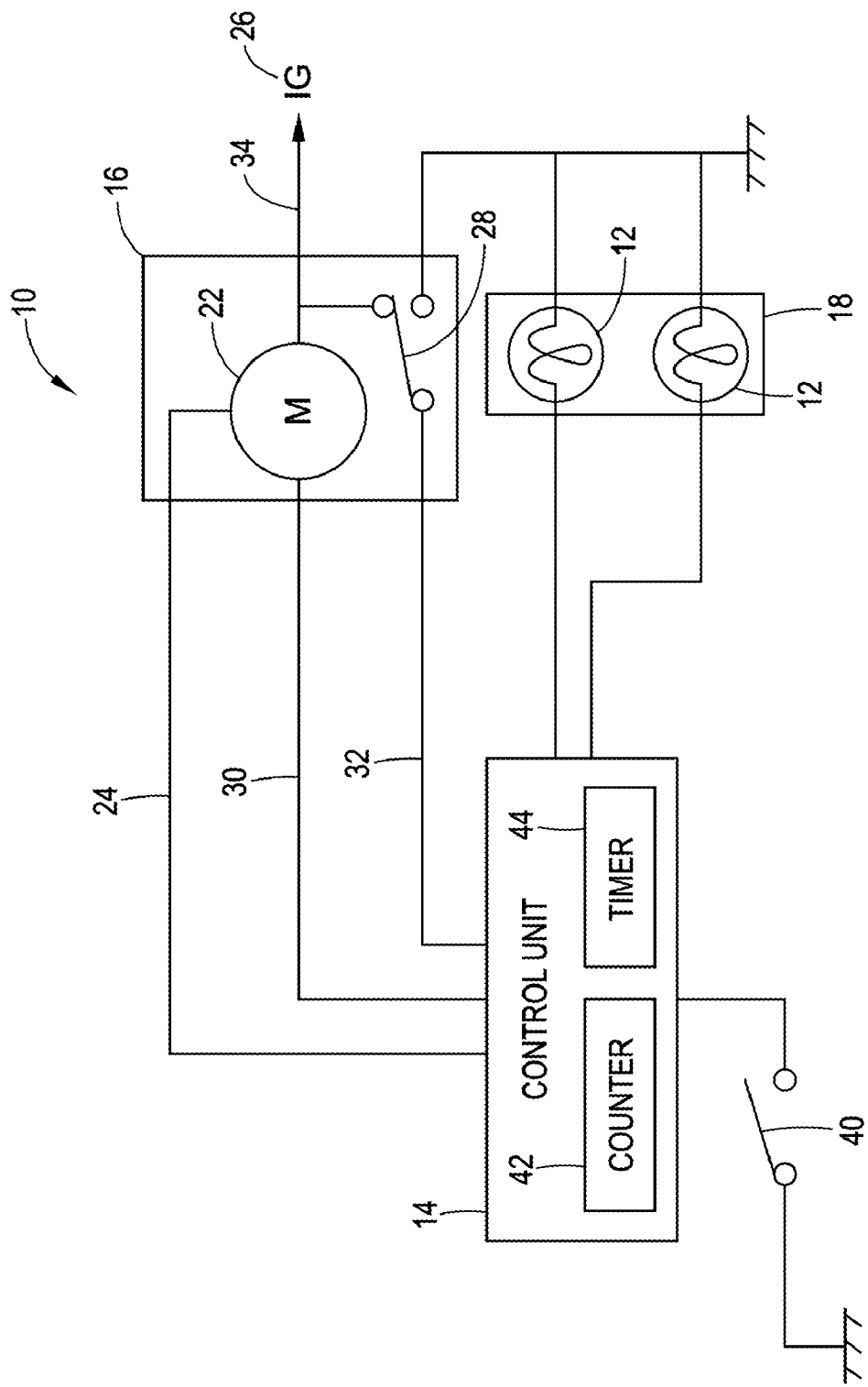
FIG. 1 is a schematic depiction of a control system for controlling headlights of a vehicle.

FIG. 1 is a diagram showing the structure of a control system 10 for controlling headlights 12 on a vehicle. The control system 10 generally includes a control unit 14, a front wiper assembly 16 and a headlight assembly 18, which in the depicted embodiment includes two headlights 12. In the illustrated embodiment, the control unit 14 is in communication with both the front wiper assembly 16 and the headlight assembly 18. The control unit 14 can control the operation of the front wiper assembly 16 and the headlights 12 in manners described below.

The front wiper assembly 16 includes a wiper motor 22 that includes a driving shaft (not shown) coupled via a transmission (not shown), e.g., a slider crank mechanism, to a front wiper (not shown). In the illustrated embodiment, each time the driving shaft makes one revolution the wiper performs one wiper operation and a pulse, or signal (HOME in FIGS. 3-5) is sent via an electrical line 24 connecting the control unit 14 to the front wiper assembly 16. When an ignition switch 26 of the vehicle is ON, the wiper motor 22 is driven and controlled so as to operate the front wiper in an operation mode that can be selected by the control unit 14. These operation modes include an intermittent ("INT") mode, a low speed ("LO") mode, a high speed ("HI") mode, and a mist ("MIST") mode. The control system 10, and more particularly the front wiper assembly 16, also includes a wiper switch 28 for controlling delivery of power to the wiper motor 22. The control unit 14 controls the delivery of power to the motor 22 via electrical lines 30 and 32. An additional electrical line 34 connects the motor 22 to the ignition switch 26, which is connected to an electrical power source for the vehicle, such as a battery (not shown).

From the wiper motor 22, the wiper operation signal ("HOME") is output every time the driving shaft of the motor 22 makes one revolution. The HOME signal, which indicates the wiper operation of the wiper by using an ON/OFF level, is input into the control unit 14, which can control the power delivered to the headlight assembly 18. When the ON and OFF state continuously alternates specific times in the HOME signal, it can be determined in the control unit 14 that rain is falling ON the vehicle, and in accordance with this determination, the threshold of illumination for each of the headlights 12 in the headlight assembly 18 can be changed.

The control system 10 also includes a headlight auto switch 40. The headlight auto switch 40 communicates with the control unit to control the operation of the headlights 12 in the headlight assembly 18. With the auto switch 40 in the ON condition, and the ignition switch 26 also in the ON condition, the headlights 12 of the headlight assembly 18 can automatically illuminate based on a detected illumination via an illumination sensor (not shown), which measures illumination, i.e., brightness, outside the vehicle.

The control system 10 further includes a counter 42 and a timer 44, which are both disclosed as being found within the control unit 14; however, each of these components can be separated from the control unit. In the illustrated embodiment, the counter 42 is configured to increment or decrement among a plurality of counter values between a headlight OFF threshold and a headlight ON threshold (see FIGS. 3-5). The timer can count towards a first time threshold (T1 in FIGS. 3-5) and a second time threshold (T2 in FIGS. 3-5) in a manner described in more detail below.

Figure 2:
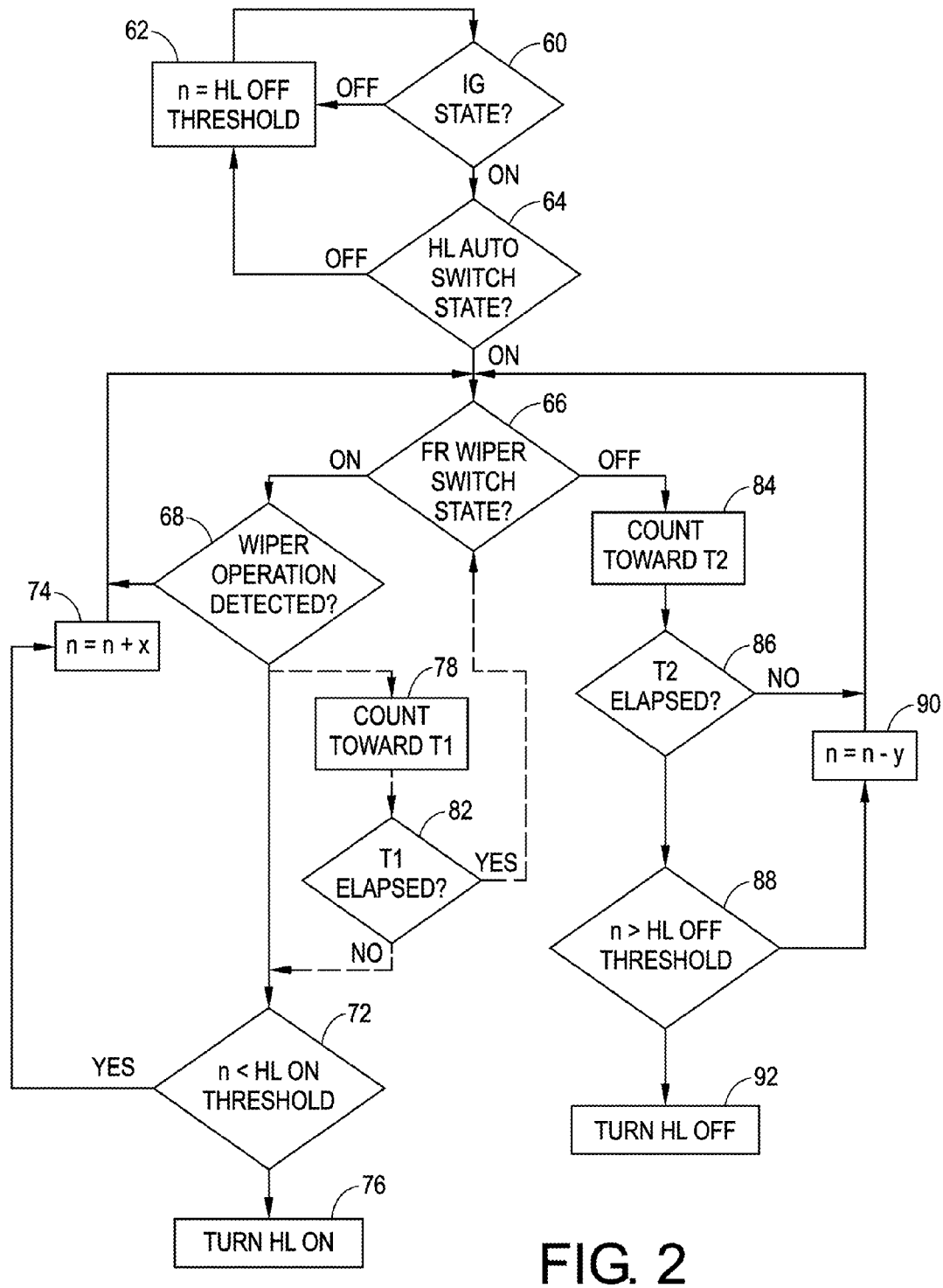
FIG. 2 is a flow diagram depicting a method for controlling the headlights of the vehicle.

FIG. 2 schematically depicts a method for controlling the headlights 12 of the vehicle. Even though FIG. 2 depicts certain steps in a logical order, these steps can be performed in other orders and the appended claims should not be limited to the order of steps recited in the claims or the order of steps depicted in FIG. 2. Moreover, the steps depicted in FIG. 2 will be described with regard to the control system 10 depicted in FIG. 1; however, the method more fully explained below can be used with other control systems laid out in manners other than that described with reference to FIG. 1.

Figure 3:
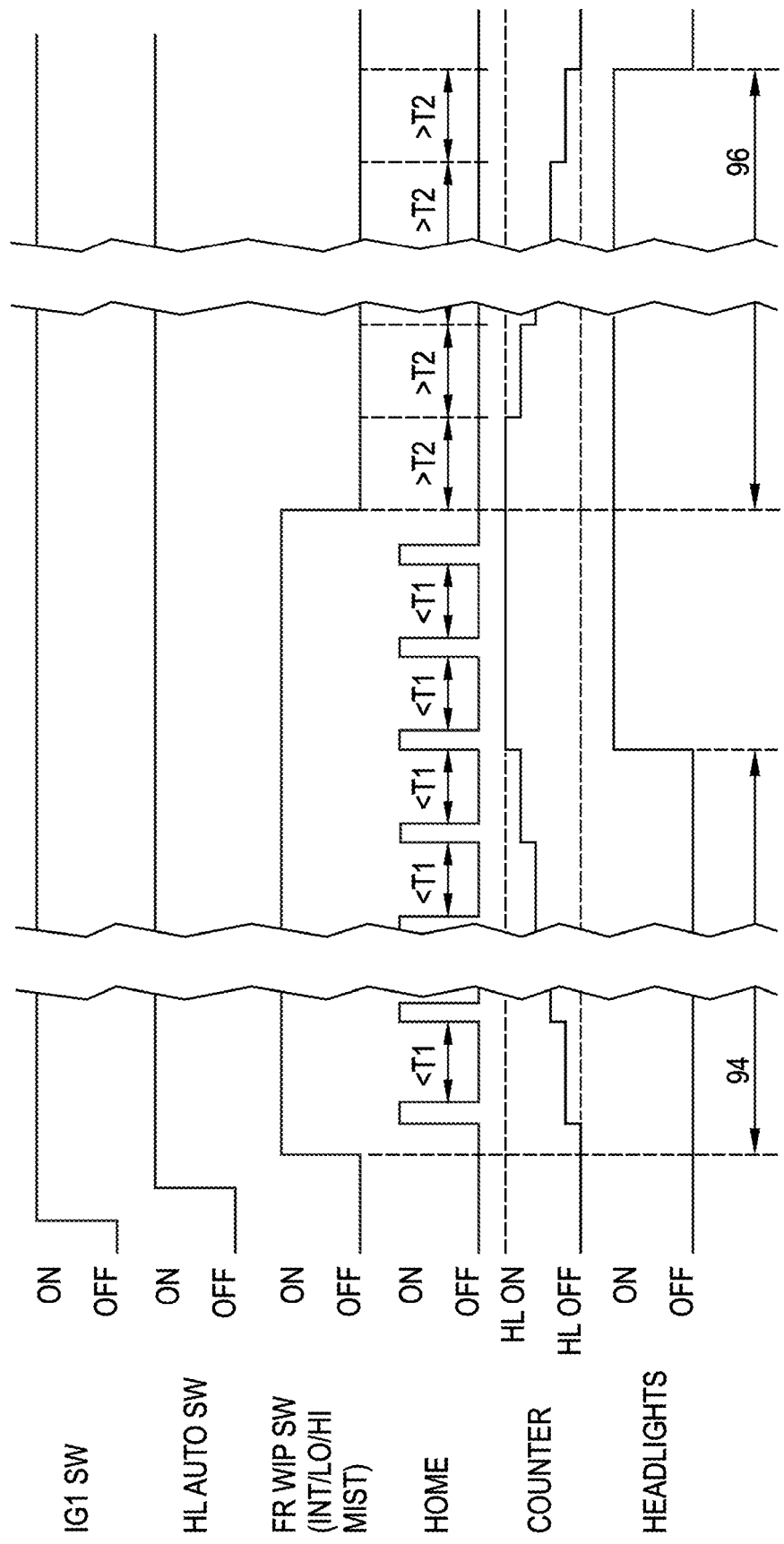
Figure 4:
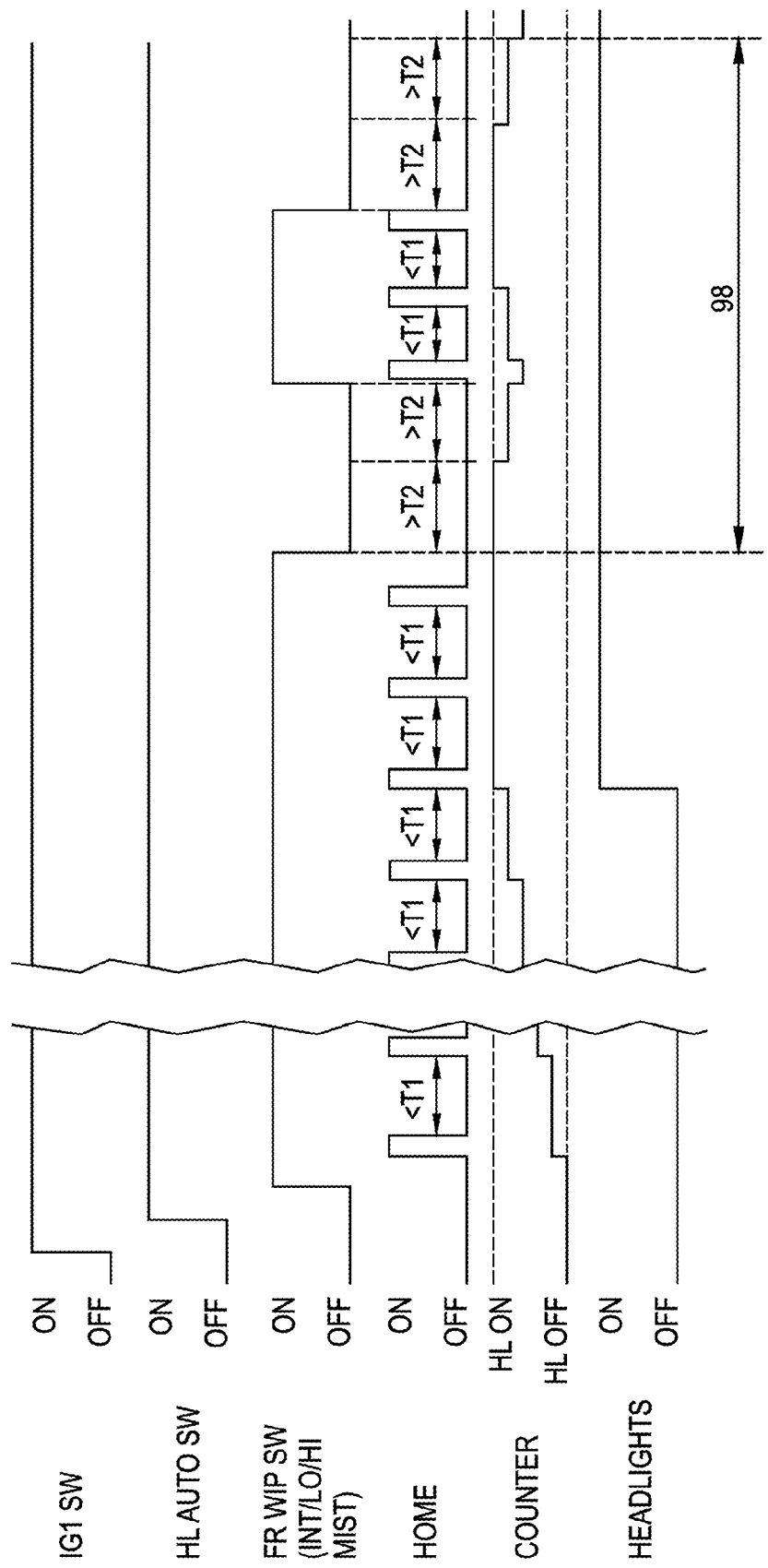

With reference to FIG. 2, at 60, a determination is made as to the state of the ignition switch 26 (FIG. 1) for the vehicle. Where the ignition switch 26 is in the OFF position, the counter value n is set to the headlight OFF threshold, at 62, and the process reverts back to determining the state of the ignition switch at 60. Where the ignition switch state is determined as ON, at 60, the state of the headlight auto switch 40 (FIG. 1) is determined at 64. When it is determined that the headlight auto switch state is OFF, at 64, the counter value n is set to the headlight OFF threshold, at 62, and the process reverts back to detecting the ignition switch state at 60. When the headlight auto switch is detected as ON, at 64, the front wiper switch state is detected at 66.

Where the front wiper switch state is detected as ON, at 66, wiper operations are detected at 68. Where no wiper operation is detected at 68 (HOME in FIGS. 3-5 is detected as OFF), then the process reverts back to detecting the front wiper switch state at 66. Where the wiper operation is detected at 68 (HOME in FIGS. 3-5 is detected as ON), a determination can be made as to whether the counter value n, which is counted by the counter 42 (FIG. 1), has reached the headlight ON threshold, at 72. If less than the headlight ON threshold number of wiper operations had been detected, at 72, then the counter value is incremented by x, at 74, and the process reverts to detecting the front wiper switch state at 66. If the counter value has reached the headlight ON threshold, at 72, then at 76, the headlights 12 in the headlight assembly 18 can be turned ON.

If desired, after a wiper operation has been detected, at 68, the timer 44 (FIG. 1) can count toward a time threshold (T1 in FIGS. 3-5) at 78. At 82, a determination can be made as to whether the time threshold (T1) has elapsed prior to detecting a next wiper operation. If the time threshold (T1) has elapsed prior to detecting a next wiper operation, as determined at 82, then the process can revert to detecting the front wiper switch state at 66. If the time threshold (T1) has not elapsed prior to detecting a next wiper operation, then the process can move to determining whether the counter value has reached the headlight ON threshold at 72.

Where the front wiper switch state is detected as OFF, at 66, the timer 44 (FIG. 1) counts towards a time threshold (T2 in FIGS. 3-5), at 84. At 86, a determination is made as to whether the time threshold (T2) has elapsed. If the time threshold (T2) has not elapsed, at 86, then the process reverts to detecting the front wiper switch at 66. If the time threshold (T2) has elapsed, at 86, then a determination is made as to whether the counter value n has reached a headlight OFF threshold at 88. Where the counter value has not reached the headlight OFF threshold, as detected at 88, then the counter value n is decremented y, at 90. If desired, x can equal y, and both can equal 1. The process then reverts to detecting the state of the front wiper switch at 66. If the counter value has reached the headlight OFF threshold, as detected at 88, then the headlights 12 can turn OFF at 92.

FIGS. 3-5 are examples of the operations described above in which variations of the wiper operation signal, the HOME signal, the time clocked by the timer 44 (FIG. 1), and a number of times counted by the counter 42 (FIG. 1) are illustrated with respect to the elapsed time, which is shown in the horizontal axis. A method for controlling headlights of the vehicle can include detecting for a wiper switch state for a wiper switch on a vehicle, which is shown at 66 in FIG. 2. The method can further include detecting wiper operations, which is shown at 68 in FIG. 2. In response to each detected wiper operation, the method can include incrementing a counter value by x, until the counter value reaches a headlight ON threshold. For example, with reference to time region 94 in FIG. 3, after the detection of each HOME signal as ON, the counter value increments upwardly from from the headlight OFF threshold toward the headlight ON threshold. The graph is broken in FIG. 3 to demonstrate that the number of counted HOME signals between the headlight OFF threshold and the headlight ON threshold can be any predetermined value. With continued reference to FIG. 3, with the ignition switch being detected as ON, the headlight auto switch being detected as ON and the counter value being detected as equal to the headlight ON threshold, e.g., a predetermined number wiper operations have been counted, the headlights 12 (FIG. 1) turn ON, which is shown at the right-hand end of time region 92.

The method for controlling the headlights 12 (FIG. 1) of the vehicle can also include counting toward a time threshold (T2) in response to detecting a wiper switch OFF state, which is shown at 86 and 66, respectively, in FIG. 2. The method can further include decrementing the counter value by y, until the counter value reaches the headlight OFF threshold in response to each instance of the time threshold (T2) elapsing with no change from the wiper switch OFF state. The graph is broken in time region 96 FIG. 3 to demonstrate that the number of counted HOME signals between the headlight ON threshold and the headlight OFF threshold can be any predetermined value. With reference to time region 96 in FIG. 3, each instance of the time threshold (T2) elapsing with no change from the wiper switch OFF state results in a counter value decrementing y from the headlight ON threshold value toward the headlight threshold OFF value. Changing the state of the headlights 12 (FIG. 1) is based on the counter value reaching one of the headlight ON threshold value and the headlight OFF threshold value. As seen in FIG. 3, a plurality of intermediate counter values are found between the headlight ON threshold value and the headlight OFF threshold value. The intermediate counter values can reduce instances where the headlights 12 would appear as flickering to oncoming traffic.

With reference to time region 98 in FIG. 4, where the front wiper switch is detected as changing from ON to OFF (left-hand end of the time region 96), the counter begins to count toward the time threshold (T2). Each instance of the time threshold (T2) elapsing with no change from the wiper switch OFF state decrements the counter value by 1 in this example, however, the counter value can decrement by other values. In the example provided in FIG. 4, however, since after the front wiper switch has been detected as turning OFF and fewer than the headlight OFF threshold of counter value increments were counted prior to the wiper switch turning back ON, the headlights of the vehicle remain ON even though the front wiper switch was turned OFF momentarily. If the headlights were to turn OFF automatically in response to the front wiper switch being turned OFF, the headlights may appear as flickering to oncoming traffic.

With reference to time region 100 in FIG. 5, where the front wiper switch has been detected as turning from ON to OFF, but less than the headlight ON threshold has been counted by the counter, the headlights remain OFF. Were the headlights to turn ON automatically in response to the front wiper switch being turned ON, where the front wiper switch has turned from ON to OFF before the headlight ON threshold has been reached by the counter, the headlights could then appear as flickering to oncoming traffic.

As seen in FIGS. 3-5, as well as in FIG. 2, changing the state of the headlights 12 is based on detecting whether the ignition of the vehicle is ON. Additionally, the method can further include setting the counter value to the headlight OFF threshold, when the ignition of the vehicle is detected as being OFF. This is shown in FIG. 2 at 62. As opposed to other systems, which do not increment between a headlight ON threshold and a headlight OFF threshold where a plurality of intermediate counter values are found between the headlight ON threshold and the headlight OFF threshold, the counter value need not be reset to the headlight OFF threshold after the front wiper switch has been turned from ON to OFF, or visa versa. These other systems can increase the likelihood of the headlights of the vehicle appearing to be flickering to oncoming traffic.

As seen in FIGS. 3-5, the method for controlling headlights can further include counting toward the time threshold (T1) in response to each detected wiper operation, which is shown at 78 in FIG. 2. Incrementing the counter value by x, can further include incrementing the counter value in response to each instance of the time threshold (T1) not elapsing prior to detecting a next wiper operation. In other words, with reference to FIG. 3, if the time elapsed between adjacent HOME ON signals is greater than the time threshold (T1), then the counter value may not increment by x toward the headlight ON threshold value. In the illustrated embodiment, the time threshold (T1) is based on at least one of a maximum intermittent delay time specification and a maximum time for wiper operation. As an example, the maximum intermittent time delay specification can be about 15 seconds and the maximum time for a wiper operation can be about two seconds. The time threshold (T2) can be set to 30 seconds, for example. Accordingly, the minimum time for turning ON the headlights can be about five seconds, when the wipers are in HI mode, the maximum time for turning ON the headlights can be about 100 seconds, and the maximum time for turning OFF the headlights can be about 150 seconds.

In the embodiment illustrated in FIGS. 2-5, the headlight OFF threshold can be 0 and the headlight ON threshold can be at least five. Nevertheless, the headlight OFF threshold and the headlight ON threshold can take other values. Moreover, the terms "increment" and "decrement" are used to show that the counter moves in opposite directions based on a detection of the front wiper switch. These terms should not be limited to requiring that the counter value increase in value only when the wiper switch is ON and decrease in value only when the wiper switch is OFF. Instead, the counter value could increment by −1 and decrement by +1 in response to changes in state from the front wiper switch.

As explained above and with reference back to FIG. 1, the control system 10 includes the wiper switch 28, the timer 44, the counter 42 and the control unit 14. In the illustrated embodiment, the counter 42 is configured to increment or decrement among a plurality of counter values between the headlight OFF threshold and the headlight ON threshold. The increment or decrement can be based on whether a state of the wiper switch 28 changes to OFF before the timer 44 measures that a time threshold (T2) has elapsed. The counter 42 can increment the counter value by one, or x, in response to detecting a wiper operation signal (HOME signal) until the counter value reaches the headlight ON threshold. The counter 42 can increment the counter value by one, or x, in response to detecting a wiper operation signal within a time threshold (T1) from a previous wiper operation until the counter value reaches the headlight ON threshold. The counter 42 can decrement the counter value by one, or y, in response to each instance that the timer 44 measures that the time threshold (T2) has elapsed with no change from a wiper OFF state. Moreover, the counter value can be set to equal the headlight OFF threshold value upon detecting the ignition switch 26 being OFF.

With reference back to FIG. 2, the method for controlling the headlights 12 (FIG. 1) of the vehicle can include detecting the wiper switch state at 66. In response to detecting a wiper switch OFF state, the method can further include counting toward a time threshold (T2) at 84. The method can further include determining whether the time threshold (T2) has elapsed before detecting a change from the wiper switch OFF state at 86. The method can further include determining whether a counter value has reached a headlight OFF threshold at 88. When the counter value has reached the headlight OFF threshold, the headlights can operate in a first state, e.g., the headlights can be turned OFF at 92. When the counter value has not reached the headlight OFF threshold value, the method can include incrementing or decrementing the counter value by one (or x or y), and repeating the detecting (at 66), counting (at 84) and both determining steps (at 82 and 84). The method can further include detecting a wiper operation, at 68, in response to detecting a wiper switch ON state at 66. The method can further include determining whether the counter value has reached a headlight ON threshold at 72. When the counter value has reached the headlight ON threshold, the method can further include operating the headlights in a second state, which is at a higher luminous power than the first state, e.g. the headlights can be turned ON at 76. When the counter value has not reached the headlight ON threshold, the method can further include repeating the detecting the wiper switch state at 66, detecting the wiper operation at 68 and determining whether the counter value has reached the headlight ON threshold at 72 until the wiper switch state changes to OFF.

The control unit 14 is configured to allow for delivery of a first power to the headlights 12 when the counter value has reached the headlight OFF threshold and to allow for delivery of a second power to the headlights when the counter value has reached the headlight ON threshold. The first power is greater than the second power. For example, where the vehicle includes daytime running lights, the first power can provide a first luminous intensity to the headlights to operate the headlights in a daytime running light mode, and the second power can provide a second, higher, luminous intensity, which can be equivalent to the low beam mode. The first power, however, could be equal to zero, which means that if rain is not detected or a sufficient number of wiper operations have not been detected (HOME signals), then the headlights 12 can be OFF.

A method for controlling headlights of a vehicle and a control system for controlling the headlights of a vehicle have been described above with particularity. Modifications and alterations will occur to those upon reading and understanding the preceding detailed description. The invention, however, is not limited to only the embodiments described above. Instead, the invention is defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for controlling headlights of a vehicle comprising:
   detecting for a wiper switch state for a wiper switch ON a vehicle;
   detecting wiper operations;
   in response to each detected wiper operation incrementing a counter value by x until the counter value reaches a headlight ON threshold;
   in response to detecting a wiper switch OFF state counting toward a time threshold (T2);
   in response to each instance of the time threshold (T2) elapsing with no change from the wiper switch OFF state decrementing the counter value by y until the counter value reaches a headlight OFF threshold value; and
   changing a state of the headlights based on the counter value reaching one of the headlight ON threshold and the headlight OFF threshold, wherein a plurality of intermediate counter values are found between the headlight ON threshold and the headlight OFF threshold.

2. The method of claim 1, wherein x and y=1.

3. The method of claim 1, wherein changing the state of the headlights is further based on detecting whether an ignition of the vehicle is ON.

4. The method of claim 3, further comprising setting the counter value to the headlight OFF threshold value when the ignition of the vehicle is detected as being OFF.

5. The method of claim 1, further comprising counting toward a time threshold (T1) in response to each detected wiper operation, and wherein incrementing a counter value by x further includes incrementing the counter value in response to each instance of the time threshold (T1) not elapsing prior to detecting a next wiper operation.

6. The method of claim 1, wherein the time threshold (T1) is based on at least one of a maximum intermittent delay time specification and a maximum time for a wiper operation.

7. The method of claim 1, wherein the headlight OFF threshold is zero and the headlight ON threshold is at least five.

8. A control system for controlling headlights of a vehicle comprising:
   a wiper switch;
   a timer;
   a counter configured to increment or decrement among a plurality of counter values between a headlight. OFF threshold and a headlight ON threshold based on whether a state of the wiper switch changes to OFF before the timer measures that a time threshold (T2) has elapsed;
   a control unit in communication with the wiper switch, the timer, and the counter, wherein the control unit is configured to allow for delivery of a first power to the headlights when the counter value has reached the headlight OFF threshold and to allow for delivery of a second power to the headlights when the counter value has reached the headlight ON threshold, wherein the first power is greater than the second power.

9. The control system of claim 8, wherein the counter increments the counter value by x in response to detecting a wiper operation signal until the counter value reaches the headlight ON threshold.

10. The control system of claim 8, wherein the counter increments the counter value by x in response to detecting a wiper operation signal within a time threshold (T1) from a previous wiper operation until the counter value reaches the headlight ON threshold.

11. The control system of claim 10, wherein the counter decrements the counter value by y in response to each instance the timer measures that the time threshold (T2) has elapsed with no change from a wiper OFF state.

12. The control system of claim 8, wherein x and y=1 and the headlight OFF threshold is zero and the headlight ON threshold is at least five.

13. The control system of claim 8, further comprising an ignition switch, wherein the counter value is set to equal to the headlight OFF threshold value upon detecting the ignition switch being OFF.

14. The control system of claim 8, wherein the first power is zero such that the headlight is OFF.

15. A method for controlling headlights of a vehicle comprising:
   detecting a wiper switch state;
   in response to detecting a wiper switch OFF state counting toward a time threshold (T2);
   determining whether the time threshold (T2) has elapsed before detecting a change from the wiper switch OFF state;
   determining whether a counter value has reached a headlight OFF threshold;
   when the counter value has reached the headlight OFF threshold, operating the headlights in a first state;
   when the counter value has not reached the headlight OFF threshold, incrementing or decrementing the counter value by one and repeating the detecting, counting and both determining steps.

16. The method of claim 15, further comprising:
   in response to detecting a wiper switch ON state detecting a wiper operation;

determining whether the counter value has reached a headlight ON threshold;

when the counter value has reached the headlight ON threshold, operating the headlights in a second state, which is at a higher luminous power than the first state;

when the counter value has not reached the headlight ON threshold, repeating the detecting the wiper switch state, detecting the wiper operation and determining whether the counter value has reached the headlight ON threshold until the wiper switch state changes to OFF.

17. The method of claim 16, further comprising:
detecting an ignition switch state; and
setting the counter value to equal the headlight OFF threshold value only after detecting the ignition switch state as being OFF.

18. The method of claim 16, wherein the headlight OFF threshold is zero and the headlight ON threshold is at least five.

* * * * *